US011418582B1

(12) United States Patent
Swain et al.

(10) Patent No.: US 11,418,582 B1
(45) Date of Patent: Aug. 16, 2022

(54) PRIORITY-BASED TRANSPORT CONNECTION CONTROL

(71) Applicant: Citrix Systems, Inc., Fort Lauderdale, FL (US)

(72) Inventors: Santosh Kumar Swain, Bangalore (IN); Rambabu Gajula, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/368,426

(22) Filed: Jul. 6, 2021

(51) Int. Cl.
*H04L 67/1004* (2022.01)
*H04L 65/1066* (2022.01)
*H04L 47/726* (2022.01)

(52) U.S. Cl.
CPC .... *H04L 67/1004* (2013.01); *H04L 29/06319* (2013.01); *H04L 47/728* (2013.01)

(58) Field of Classification Search
CPC ............... H04L 67/1004; H04L 47/728; H04L 29/06319
See application file for complete search history.

(56) References Cited

U.S. PATENT DOCUMENTS

| 8,825,832 | B2 * | 9/2014 | Whipple | H04L 67/14 709/224 |
| 11,153,788 | B2 * | 10/2021 | Park | H04W 8/08 |
| 11,258,716 | B1 * | 2/2022 | Coglitore | H04L 47/283 |
| 2006/0020698 | A1 * | 1/2006 | Whipple | H04L 69/40 709/224 |
| 2006/0184671 | A1 * | 8/2006 | Boys | H04L 67/306 709/224 |
| 2008/0247308 | A1 * | 10/2008 | Bhupalam | G06F 11/1658 370/503 |
| 2009/0037763 | A1 * | 2/2009 | Adhya | H04L 69/40 714/4.12 |
| 2009/0037998 | A1 * | 2/2009 | Adhya | H04L 69/40 726/11 |
| 2009/0054061 | A1 * | 2/2009 | Dawson | H04B 17/318 455/434 |
| 2009/0180444 | A1 * | 7/2009 | McManus | H04W 36/0016 370/332 |
| 2011/0041002 | A1 * | 2/2011 | Saavedra | H04L 41/5009 714/E11.073 |
| 2011/0188451 | A1 * | 8/2011 | Song | H04W 36/0033 370/328 |
| 2011/0264800 | A1 * | 10/2011 | Allred | H04L 61/2567 709/227 |

(Continued)

*Primary Examiner* — Jimmy H Tran
(74) *Attorney, Agent, or Firm* — Foley & Lardner LLP

(57) ABSTRACT

Described embodiments provide systems and methods for priority-based transport connection control. A first packet engine can read connection information of existing connections of a second packet engine written to a shared memory region by the second packet engine. The first packet engine can establish one or more virtual connections according to the connection information of existing connections of the second packet engine. Each of the first packet engine and the second packet engine can receive mirrored traffic data. The first packet engine can receive a first packet and determine that the first packet is associated with a virtual connection corresponding to an existing connection of the second packet engine. The first packet engine can drop the first packet responsive to the determination that the first packet is associated with the virtual connection.

20 Claims, 12 Drawing Sheets

(56) References Cited

U.S. PATENT DOCUMENTS

| | | | | |
|---|---|---|---|---|
| 2012/0173918 A1* | 7/2012 | Olson | ............... | H04L 41/06 |
| | | | | 714/3 |
| 2013/0064255 A1* | 3/2013 | Saavedra | ............ | H04L 45/245 |
| | | | | 370/536 |
| 2013/0286942 A1* | 10/2013 | Bonar | ............... | H04W 16/16 |
| | | | | 370/328 |
| 2014/0304409 A1* | 10/2014 | Kamath | ............ | H04L 67/1036 |
| | | | | 709/225 |
| 2014/0344326 A1* | 11/2014 | Kamath | ............ | G06F 9/5027 |
| | | | | 709/203 |
| 2015/0085759 A1* | 3/2015 | Gajula | ............ | H04W 72/02 |
| | | | | 370/329 |
| 2015/0113164 A1* | 4/2015 | Butler | ............ | H04L 45/22 |
| | | | | 709/239 |
| 2016/0182383 A1* | 6/2016 | Pedersen | ............ | H04L 45/24 |
| | | | | 709/226 |
| 2016/0191363 A1* | 6/2016 | Haraszti | ............ | H04L 43/0888 |
| | | | | 709/223 |
| 2016/0360461 A1* | 12/2016 | Travostino | ............ | H04W 40/02 |
| 2017/0033975 A1* | 2/2017 | Poojary | ............ | H04L 41/0668 |
| 2017/0104689 A1* | 4/2017 | Narayanasamy | ... | G06F 9/45558 |
| 2017/0180486 A1* | 6/2017 | Mehta | ............ | H04W 4/02 |
| 2017/0257278 A1* | 9/2017 | Jones | ............ | H04L 41/22 |
| 2018/0199398 A1* | 7/2018 | Dao | ............ | H04L 41/0806 |
| 2018/0278570 A1* | 9/2018 | Dhanabalan | ............ | H04L 67/101 |
| 2018/0332123 A1* | 11/2018 | Schneider | ............ | H04W 4/16 |
| 2018/0351867 A1* | 12/2018 | Dhanabalan | ............ | H04L 43/0864 |
| 2019/0149482 A1* | 5/2019 | Kumar | ............ | H04L 67/1004 |
| | | | | 709/226 |
| 2019/0182123 A1* | 6/2019 | Gupta | ............ | H04L 41/147 |
| 2019/0207848 A1* | 7/2019 | Guo | ............ | H04L 45/68 |
| 2019/0223062 A1* | 7/2019 | Kant | ............ | H04W 76/12 |
| 2020/0169464 A1* | 5/2020 | Ramareddy | ............ | G06F 9/5011 |
| 2020/0366637 A1* | 11/2020 | Dhanabalan | ............ | H04L 61/2007 |
| 2021/0029039 A1* | 1/2021 | Twitchell, Jr. | ............ | H04L 41/0896 |
| 2021/0211902 A1* | 7/2021 | Achyuth | ............ | H04W 76/19 |

* cited by examiner

PRIORITY-BASED TRANSPORT CONNECTION CONTROL

FIELD OF THE DISCLOSURE

The present application generally relates to priority-based transport connection control. In particular, this technical solution can maintain multiple connections between a client and a server to maintain a communication session and switch between the connections based on their assigned priorities.

BACKGROUND

When a client connects to a server for a virtualized application/desktop session, the connection may fail or drop, causing the client to lose access to the virtualized application/desktop session. When a connection between the client and the server fails, the client may attempt to create a new connection with the server, often using a different transport connection. Establishing the new connection may result in significant downtime of services and, if the new connection attempt is successful, may cause the client to have a connection with the server that has significant latency and/or that is likely to drop.

SUMMARY

This Summary is provided to introduce a selection of concepts in a simplified form that are further described below in the Detailed Description. This Summary is not intended to identify key features or essential features, nor is it intended to limit the scope of the claims included herewith.

Implementations of the systems and methods discussed herein provide for an improved method of transport connection control that enables a seamless transition between established connections between a client and a server to create a virtualized application/desktop session. Multiple network connections may be maintained between the client and the server maintaining the virtual session such that if an active network connection drops or fails, the client may maintain its session with the server by automatically switching to another connection that the client maintains in parallel with the dropped connection. The connections may be assigned priorities based on the strength of their connections so if one or more of the connections drop, the client may switch to the next strongest connection to maintain its virtual session with the server.

For example, in some implementations, when a client connects to a server for a virtual session, the client may establish a series of connections via multiple transport ports using different data transport protocols. The server may maintain a list of priorities for the series of connections and identify the connection with the highest priority to use to maintain a virtual session with the client. The server and client may maintain each of the established connections as the client accesses the virtual session. Thus, when the client loses its connection with the server through the connection the client is currently using to access the virtual session, the server may migrate the session to the maintained connection with the next highest priority. The client may then access the virtual session through the migrated connection with minimal downtime while maintaining a strong connection with the server. The server may repeat this process each time the client's connection with the virtual session drops, in some cases while attempting to re-establish previously dropped connections so the client may maintain its connection to the virtual session with minimal disruption to the user experience. Thus, the client may maintain its connection to the virtual server without requiring a reboot and/or without the client needing to establish a new connection with the server each time the client's connection drops.

At least one aspect of this technical solution is directed to a method. The method may include receiving, by a server computing device from a client computing device via a first connection, a first request to establish a communication session, the first request comprising a first session identifier, and the first connection having a first communication property and a first priority; initiating, by the server computing device, the communication session with the client computing device via the first connection; receiving, by the server computing device from the client computing device via a second connection, a second request to establish a communication session, the second request comprising the first session identifier included in the first request, and the second connection having a second communication property and a second priority; determining, by the server computing device responsive to the second request comprising the first session identifier included in the first request, that the second priority of the second connection exceeds the first priority of the first connection; and responsive to the determination, migrating, by the server computing device, the communication session to the second connection.

In some implementations, the first request comprises an identifier of the first priority, and wherein the second request comprises an identifier of the second priority. In some implementations, the method comprises determining, by the server computing device, the first priority is based on the first communication property and the second priority based on the second communication property. In some implementations, migrating the communication session to the second connection comprises transmitting, by the server computing device, a connection standby command via the first connection. In some implementations, the method further comprises, subsequent to transmitting the connection standby command via the first connection, determining, by the server computing device, the first connection has dropped; and re-establishing, by the server computing device, the first connection while concurrently maintaining the communication session via the second connection. In some implementations, migrating the communication session to the second connection comprises detaching the first connection from a server application providing the communication session and attaching the second connection to the server application.

In some implementations, the method further comprises subsequently receiving, by the server computing device from the client computing device via a third connection, a third request to establish a communication session, the third request comprising the first session identifier included in the first request, and the third connection having a third communication property and a third priority; determining, by the server computing device responsive to the third request comprising the first session identifier included in the first request, that the third priority of the third connection is less than the second priority of the second connection; and responsive to the determination that the third priority is less than the second priority, transmitting, by the server computing device, a connection standby command via the third connection. In some implementations, the first communication property comprises an encryption type, a compression type, a connection latency, a connection bandwidth, a connection loss rate, a transport protocol, a network path, a network type, a Quality-of-Service (QoS) setting, a source domain, or a destination domain.

In some implementations, the method further comprises subsequent to migrating the communication session to the second connection, determining, by the server computing device, the second connection has dropped; identifying, by the server computing device, a third connection responsive to the third connection having a higher priority than the first connection; and migrating, by the server computing device, the communication session to the third connection responsive to the determination that the second connection dropped and the identification of the third connection. In some implementations, the method further comprises subsequent to migrating the communication session to the second connection, transmitting, by the server computing device, a data packet of the communication session to the client computing device via the second connection.

At least one aspect of this technical is solution is directed to a system. The system may comprise a server computing device comprising at least one network interface in communication with a client computing device via a plurality of connections, and a processor configured to receive, via a first connection of the plurality of connections, a first request to establish a communication session, the first request comprising a first session identifier, and the first connection having a first communication property and a first priority, initiate the communication session with the client computing device via the first connection, receive, via a second connection of the plurality of connections, a second request to establish a communication session, the second request comprising the first session identifier included in the first request, and the second connection having a second communication property and a second priority, determine, responsive to the second request comprising the first session identifier included in the first request, that the second priority of the second connection exceeds the first priority of the first connection, and responsive to the determination, migrate the communication session to the second connection.

In some implementations, the first request comprises an identifier of the first priority, and wherein the second request comprises an identifier of the second priority. In some implementations, the processor is further configured to determine the first priority based on the first communication property and the second priority based on the second communication property. In some implementations, the processor is further configured to transmit a connection standby command via the first connection. In some implementations, the processor is further configured to detach the first connection from a server application providing the communication session and attach the second connection to the server application.

In some implementations, the processor is further configured to subsequently receive, via a third connection of the plurality of connections, a third request to establish a communication session, the third request comprising the first session identifier included in the first request, and the third connection having a third communication property and a third priority, determine, responsive to the third request comprising the first session identifier included in the first request, that the third priority of the third connection is less than the second priority of the second connection, and responsive to the determination that the third priority is less than the second priority, transmit a connection standby command via the third connection. In some implementations, the first communication property comprises an encryption type, a compression type, a connection latency, a connection bandwidth, a connection loss rate, a transport protocol, a network path, a network type, a Quality-of-Service (QoS) setting, a source domain, or a destination domain.

At least one aspect of this technical solution is a method. The method may comprise transmitting, by a client computing device to a server computing device via a first connection, a first request to establish a communication session, the first request comprising a first session identifier, and the first connection having a first communication property and a first priority; transmitting, by the client computing device to the server computing device via a second connection, a second request to establish a communication session, the second request comprising the first session identifier included in the first request, and the second connection having a second communication property and a second priority; receiving, by the client computing device from the server computing device via the first connection, at least one packet of the communication session; subsequently receiving, by the client computing device from the server computing device via the first connection, a connection standby command, the connection standby command transmitted responsive to receipt of the second request to establish the communication session and the second priority exceeding the first priority; and receiving, by the client computing device from the server computing device via the second connection, at least one additional packet of the communication session.

In some implementations, the first request comprises an identifier of the first priority, and wherein the second request comprises an identifier of the second priority. In some implementations, the method may further comprise determining, by the client computing device, the first priority based on the first communication property and the second priority based on the second communication property. In some implementations, the method may further comprise transmitting, by the client computing device to the server computing device via a third connection, a third request to establish a communication session, the third request comprising the first session identifier included in the first request, and the third connection having a third communication property and a third priority; and receiving, by the client computing device from the server computing device via the third connection, a second connection standby command, the second connection standby command transmitted responsive to receipt of the third request to establish the communication session and the second priority exceeding the third priority.

In some implementations, the method may further comprise determining, by the client computing device, that a transmission of a packet of the communication session via the second connection was unsuccessful; and retransmitting, by the client computing device, the packet via the first connection responsive to the determination. In some implementations, the first communication property comprises an encryption type, a compression type, a connection latency, a connection bandwidth, a connection loss rate, a transport protocol, a network path, a network type, a Quality-of-Service (QoS) setting, a source domain, or a destination domain.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes systems and methods for priority-based transport connection control.

A. Network and Computing Environment

Figure 1A:
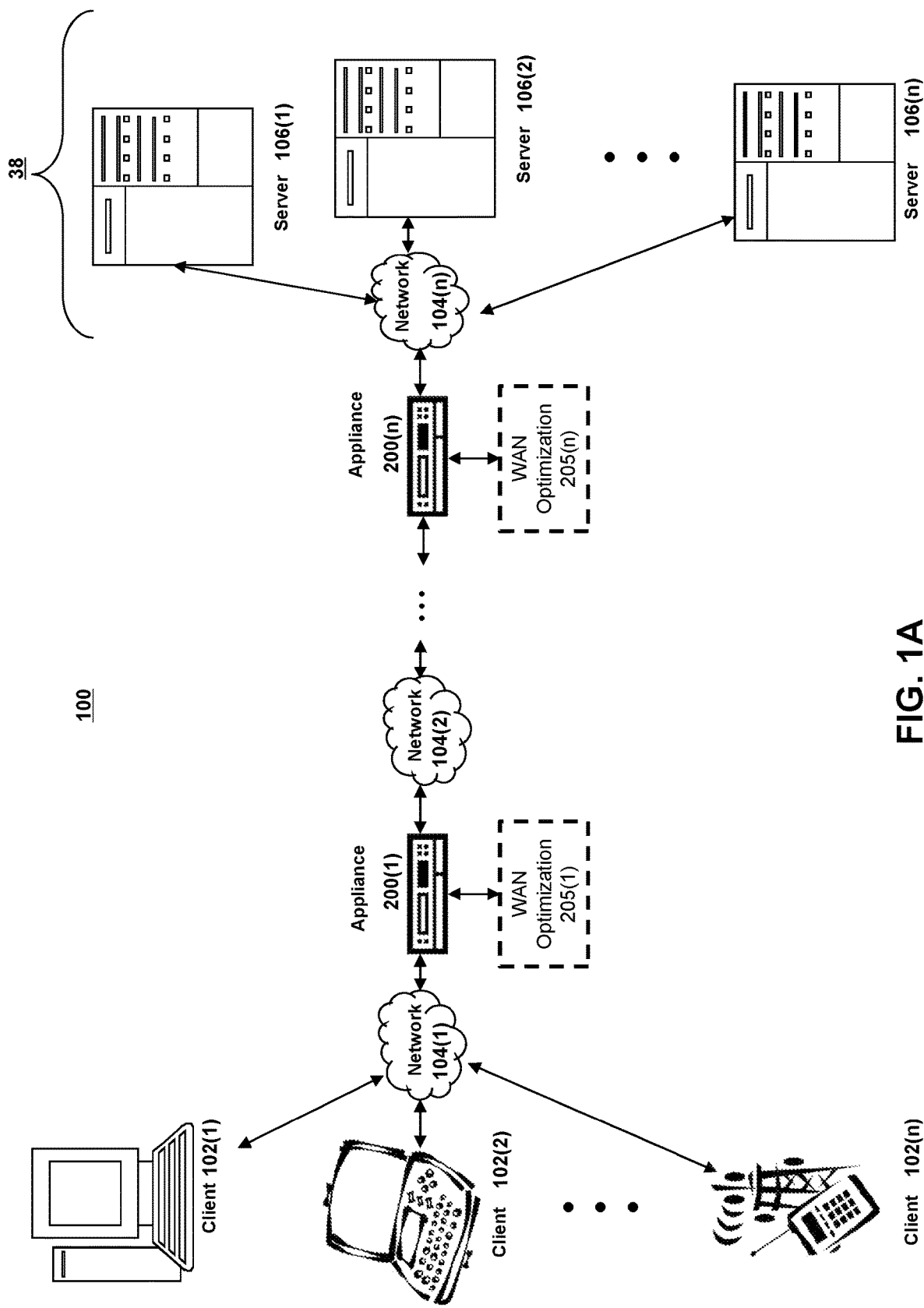
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
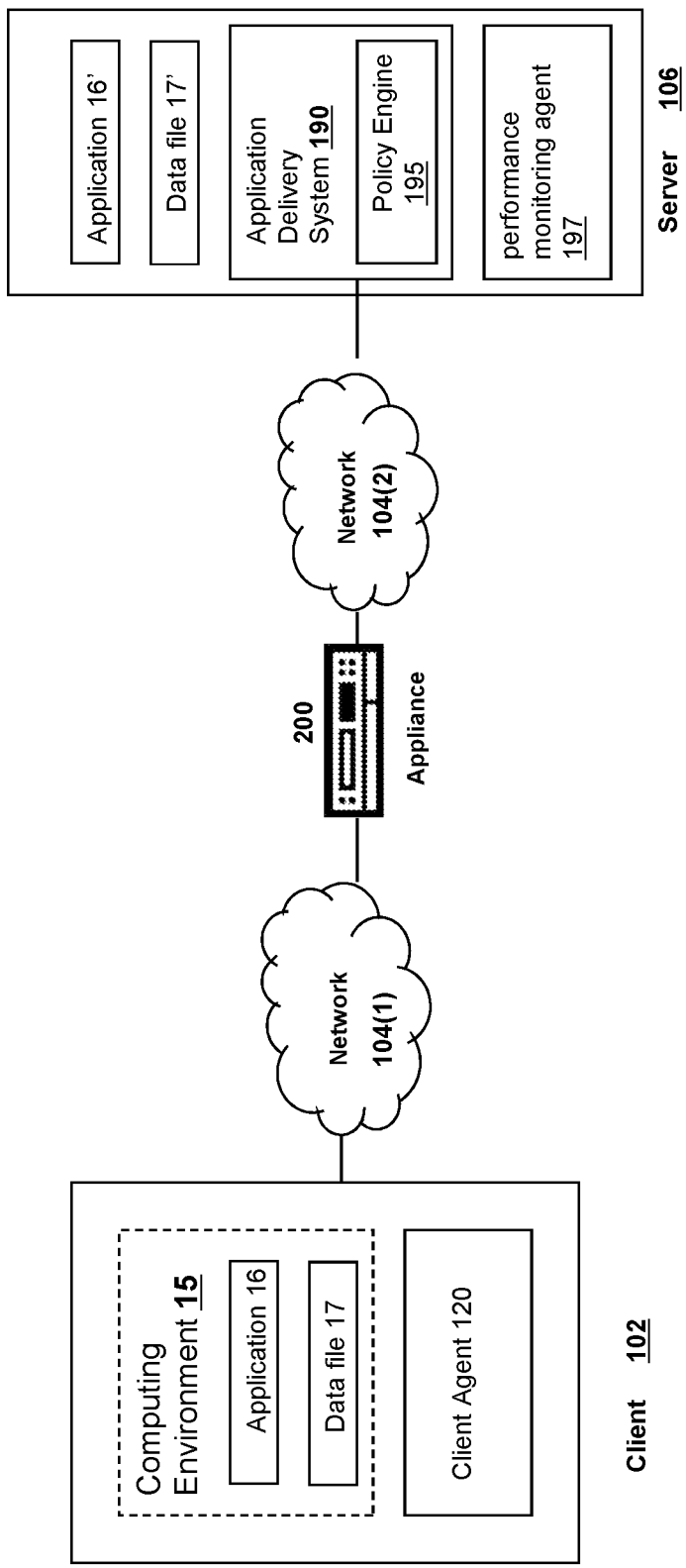
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client agent 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents 120 and 197 may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
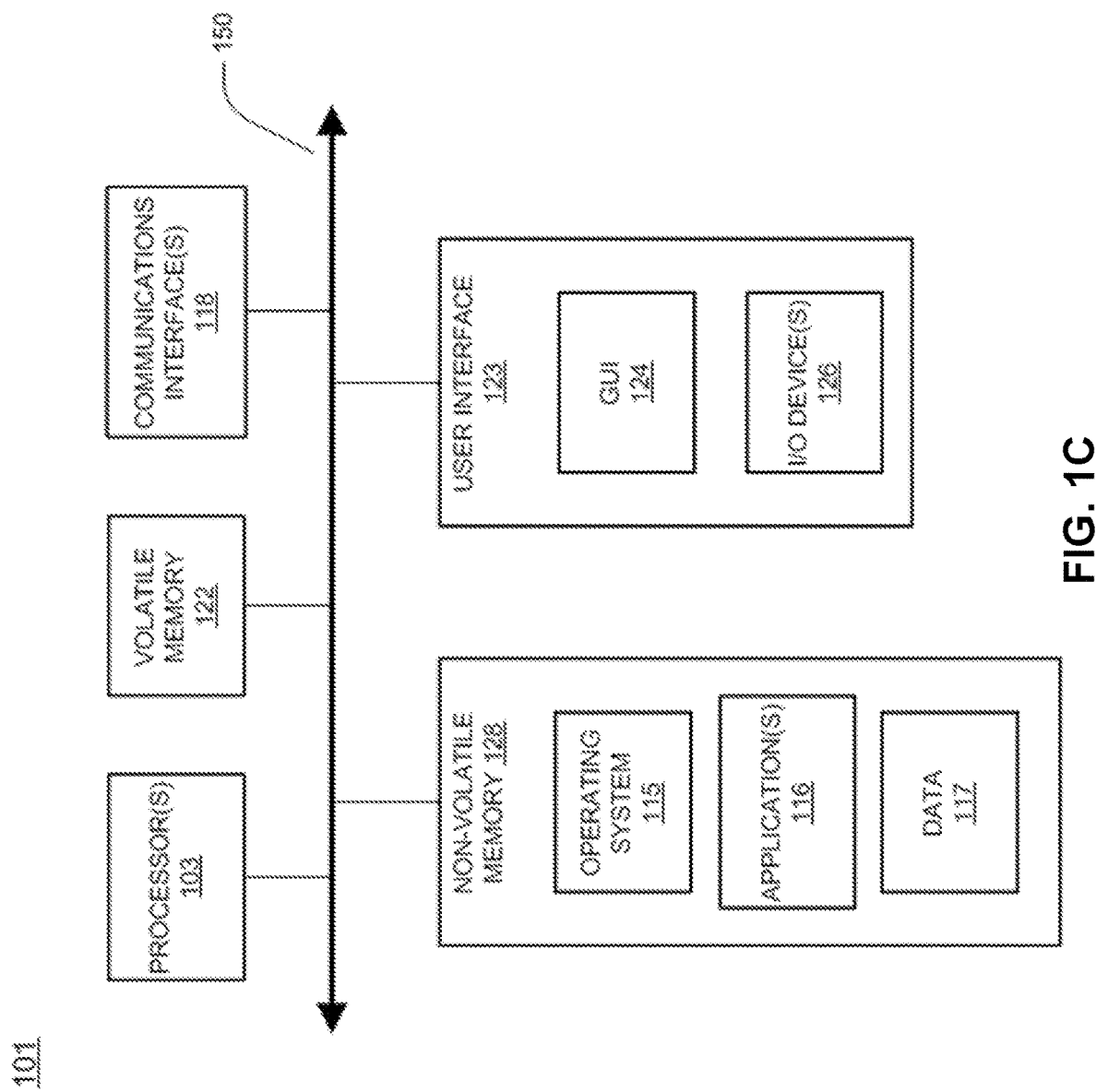
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, computer 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
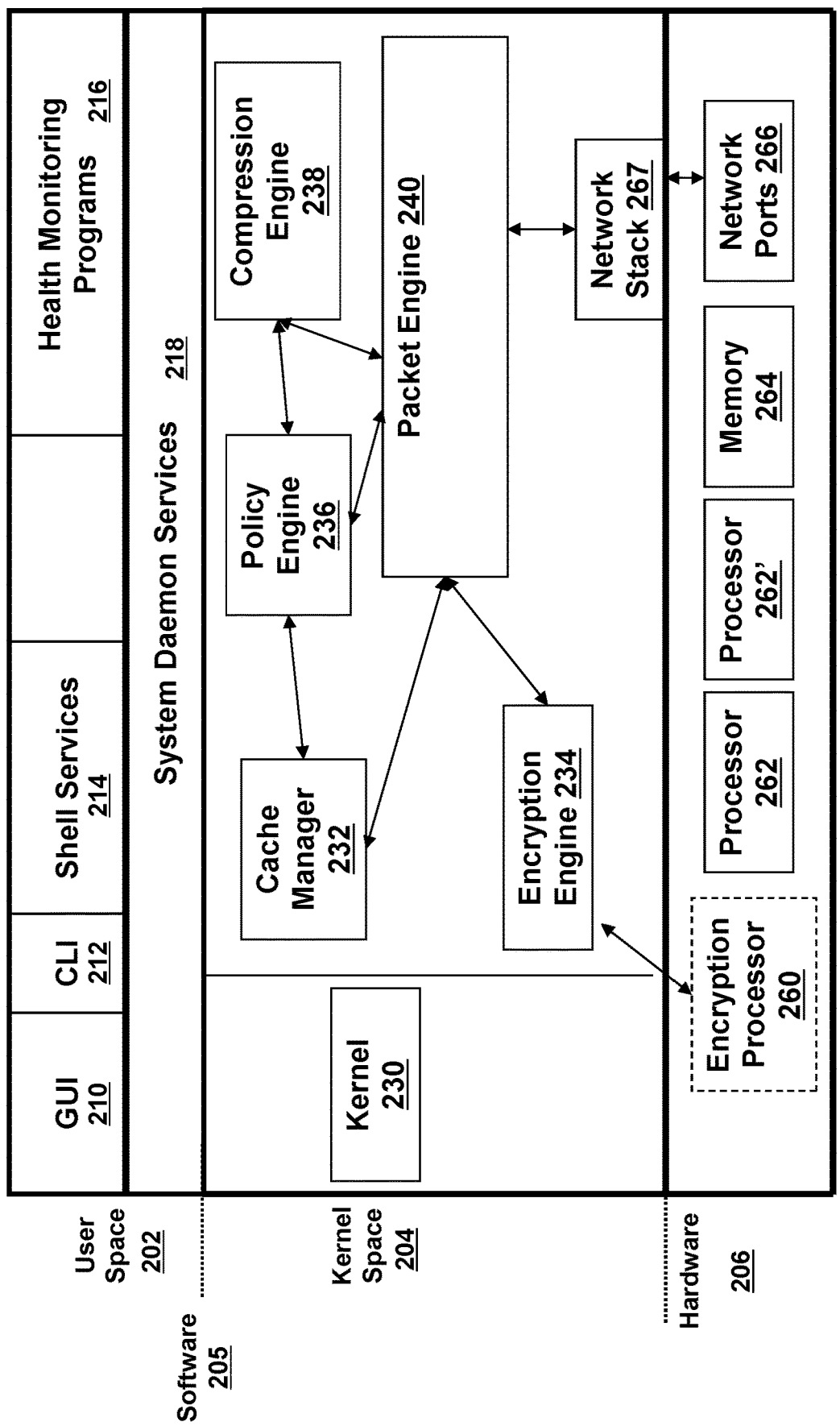
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 16. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task, or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
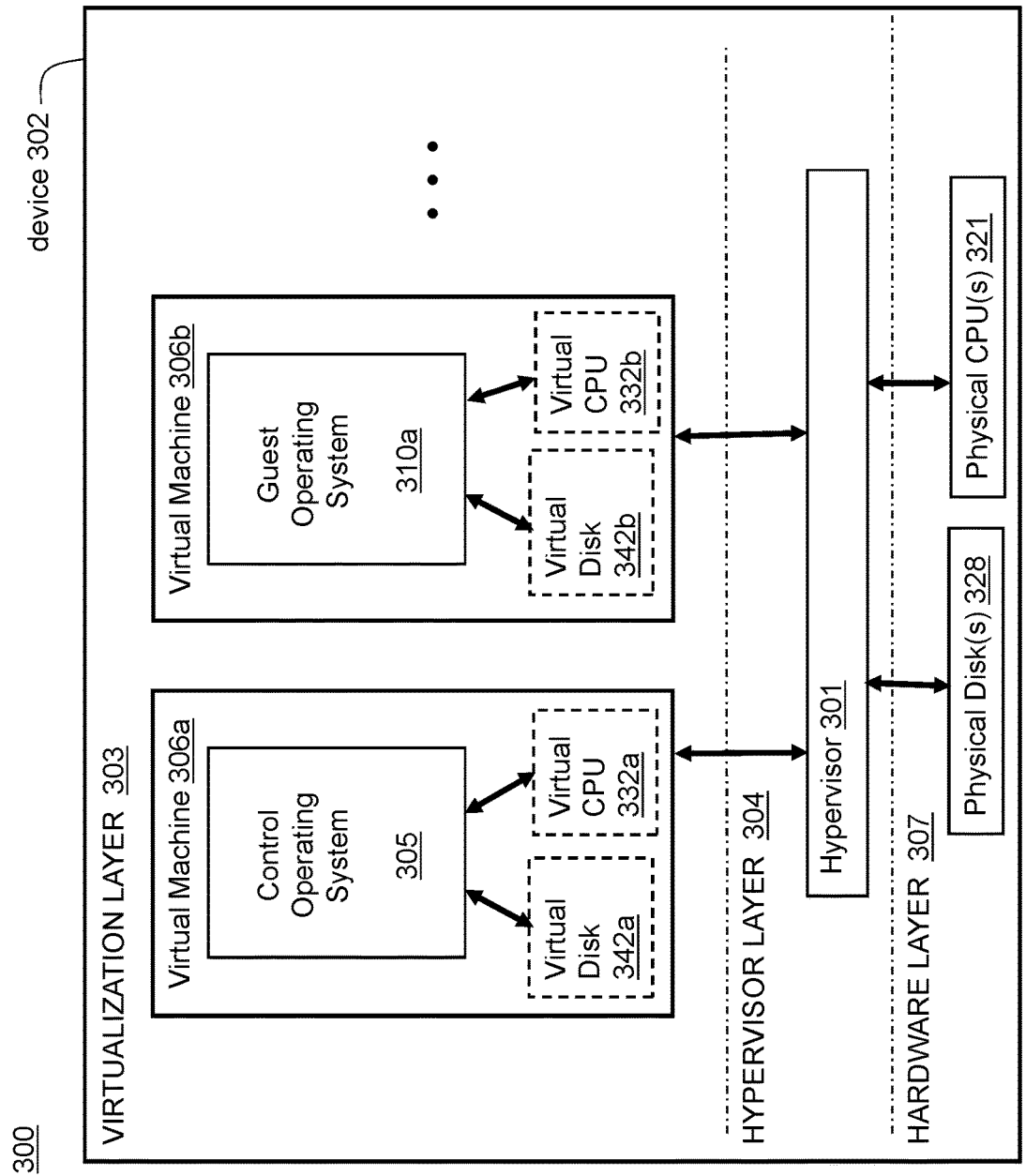
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
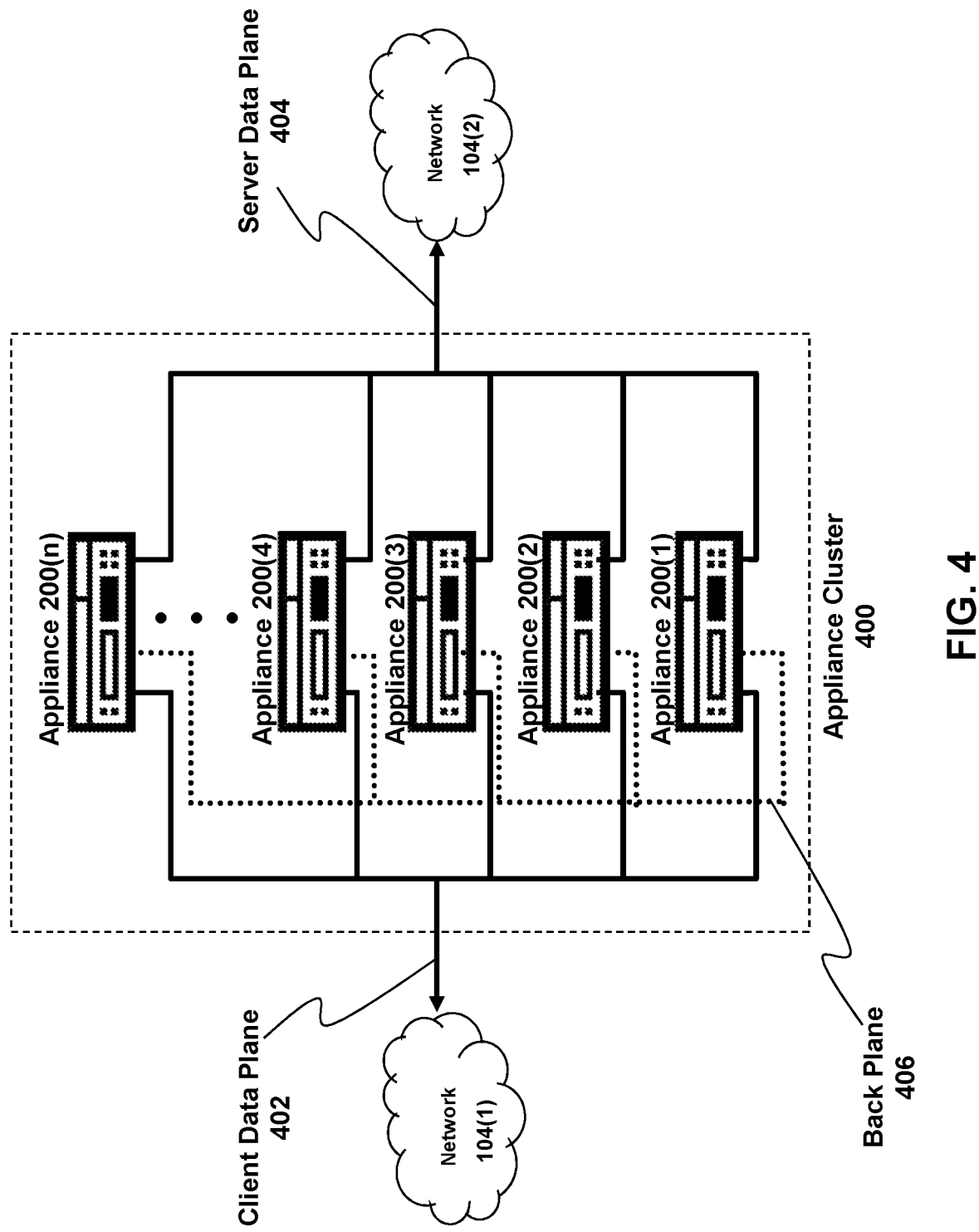
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Priority-Based Transport Connection Control

When a client attempts to connect to a server for a virtualized application/desktop session, the connection attempt may fail and the client may not be able to connect or the client may successfully connect and then the connection may drop, causing the client to lose access to the virtualized application/desktop session. When a connection attempt between the client and the server fails, the client may attempt to create a new connection with the server, often using a different transport connection. The client may iteratively attempt to create connections with the server until it can successfully establish a connection that enables the client to connect to the virtualized application/desktop session being maintained by the server. This connection process can result in significant downtime of services and, if the new connection attempt is successful, may cause the client to have a poor connection with the server because while the connection may have been successfully established, the connection may have significant latency or be likely to drop.

Furthermore, upon establishing a connection with the server, the connection may still be likely to drop. If the connection drops, a user accessing the communication session may lose access to the communication session as the client attempts to establish another connection to the server. This downtime may be significant depending on the number of connection attempts the client may make with the server until the client can successfully establish another connection. Even when the client is able to establish a connection, the connection may be weak and liable to drop again, causing the client to seek to establish another connection and for the cycle to repeat itself.

Figure 5A:
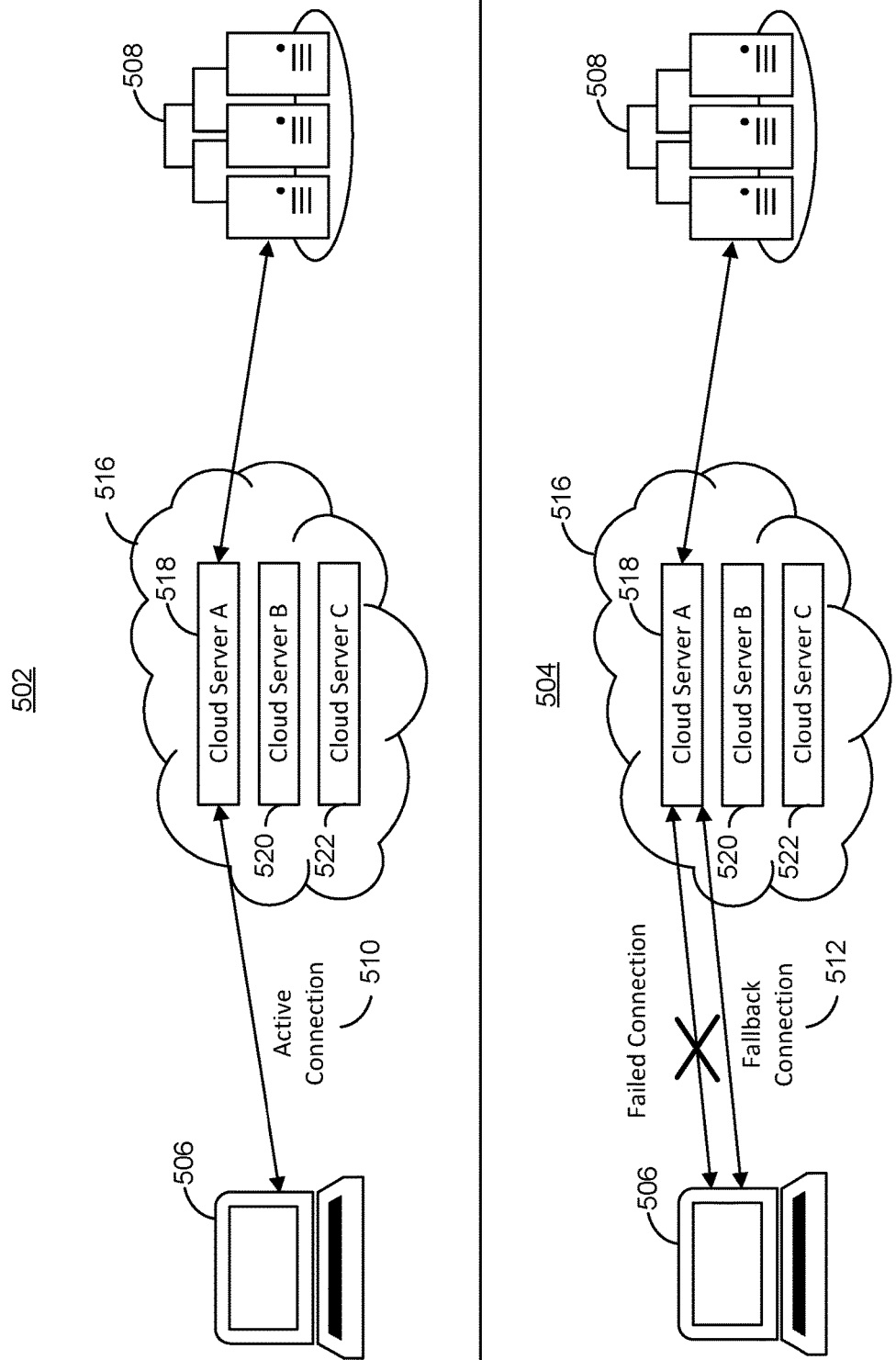
FIG. 5A is a sequence diagram of a client losing connection with a virtual session and creating a fallback connection with the virtual session, in accordance with an illustrative embodiment.

For example, referring first to FIG. 5A, depicted is a sequence diagram of a client device losing connection with a communication session (e.g., a virtualized application and/or desktop session) and creating a fallback connection with the communication session. The sequence diagram is shown to include two sequences 502 and 504 in which a client device establishes a connection with a server to access a communication session. Sequence 502 may be a sequence of a client device 506 establishing an active connection 510 with one or more servers 508 to access a communication session hosted by servers 508. Sequence 504 may be a sequence subsequent to sequence 502 illustrating active connection 510 dropping and client device 506 resorting to creating a fallback connection 512 with one or more servers 508 to access a new communication session.

In sequence 502, client device 506 establish active connection 510 with one or more servers 508 by transmitting a connection request through a cloud system infrastructure 516. In some implementations, cloud system infrastructure 516 may be another network such as a cellular network or the Internet. Cloud system infrastructure 516 may contain cloud servers 518, 520, and 522 that may be configured to access or otherwise be in communication with one or more servers 508. Cloud servers 518, 520, and/or 522 may be owned or otherwise correspond to different cloud service providers. In some implementations, cloud system infrastructure 516 and cloud servers 518, 520, and/or 522 may facilitate network communication with servers 508 to enable client device 506 and/or other client device to access communication sessions that are hosted on servers 508. Cloud servers 518, 520, 522 may be configured to store data about the connection such as an encryption type, a compression type, a connection latency, a connection bandwidth, a connection loss rate, a transport protocol, a network path, a network type, a Quality-of-Service (QoS) setting, a source domain, or a destination domain of the connections between the clients and the servers 508.

As illustrated, in sequence 502 client device 506 may attempt to connect or successfully connect to servers 508 through cloud server 518. Client device 506 may do so via different transport connection protocols that enable client device 506 to access a communication session hosted by servers 508. However, during the attempt or the connection, in sequence 504 the client device 506 may fail to establish a connection with servers 508 or otherwise lose an established connection. Upon the connection failing or upon losing connection, client device 506 may create a fallback connection 512 with the servers 508 to access a new communication session. The reconnection attempt may take a significant amount of time and may result in client device 506 not having access to a communication session during the down time. Further, if client device 506 loses its connection after establishing the connection and accessing the communication session, client device 506 may have to establish an entirely new communication session instance, causing the client device 506 to potentially lose any unsaved data or needing to reset the settings of the communication session to the settings of the previous communication session instance.

Moreover, the sequence diagram depicted in FIG. 5A illustrates a few other challenges that systems that do not implement that systems and methods described herein encounter when a client fails to establish a connection with a server or loses a previously established connection with the server. First, when client device 506 initially establishes a connection with servers 508, client device 506 may only establish one connection path with the servers 508. Client device 506 may establish the connection with the closest (e.g., geographically closest) point of presence or server 508 regardless of whether a connection with another server would be stronger (e.g., be more likely to successful connection, be faster, be less likely to drop, etc.). Thus, even if client device 506 successfully establishes a connection with one of servers 508, the connection may not be as strong as it could have been if client device 506 connected with another server. Second, client device 506 may not be able to manage the connections it establishes based on established preferred properties (e.g., SSL/DTLS crypto cipher, preference, etc. for the connection between client device 506 and one or more servers 508). Different users may prefer different types of connections. However, previous systems may only attempt to establish one connection regardless of the users' preferences. Third, while different connections may be stronger in some instances (e.g., one connection may be stronger because it has less network traffic than another connection), previous systems may not be able to account for these changes and instead rely on a fixed connection preference when connecting to servers 508.

Implementations of the systems and methods discussed herein improve upon the above-described deficiencies by providing for an improved method of transport connection control that enables a client device to connect to a server to access a communication session with multiple connections in parallel. The systems and methods may enable a seamless transition between established connections to create a communication session that is less likely to drop. Consequently, if an active connection (e.g., the connection with which a client is accessing a communication session) drops or fails, the client may still maintain its session with the server by automatically switching to another connection that the client has maintained in parallel with the dropped connection. The connections may be assigned priorities based on the strength of their connections so if a connection drops, the client may switch to the next strongest connection to maintain its communication session with the server.

Figure 5B:
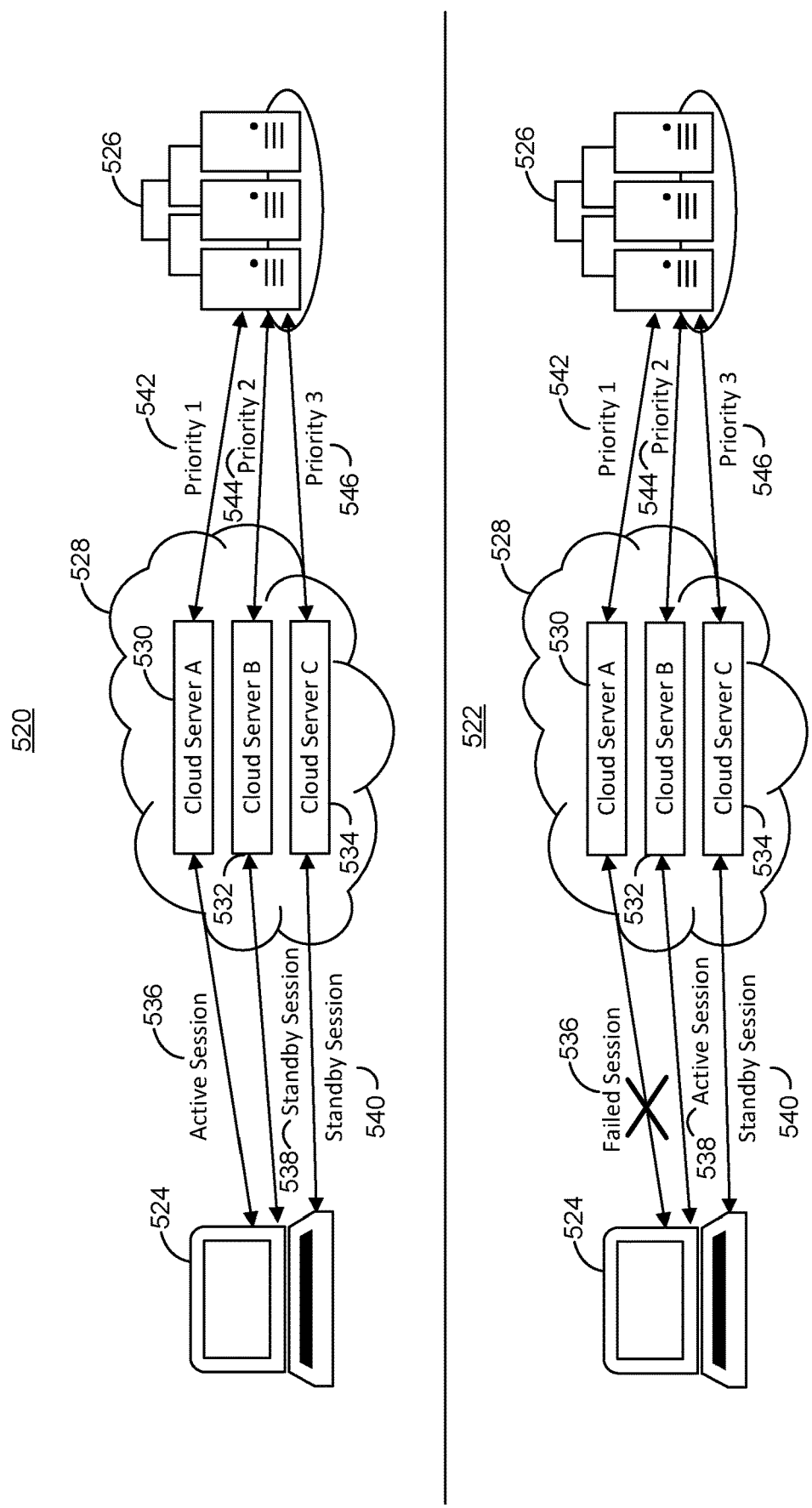
FIG. 5B is a sequence diagram of a client maintaining multiple connections for a virtual session and switching connections, in accordance with an illustrative embodiment.

For example, referring to FIG. 5B, depicted is a sequence diagram of a client device establishing multiple connections with servers to establish a resilient virtual connection with a communication session. The sequence diagram is shown to include two sequences 520 and 522 in which a client device establishes multiple connections with one or more servers in parallel. Sequence 520 may be a sequence of a client 524 establishing multiple sessions with servers 526 for a communication session. Sequence 522 may be a sequence subsequent to sequence 520 illustrating one of the established connections failing and client 524 switching connections to access a communication session hosted by the servers using a different previously established connection.

In sequence 520, client 524 may attempt to establish multiple connections with one or more servers 528 by transmitting multiple connection requests through a cloud system infrastructure 528. Cloud system infrastructure 528 may contain cloud servers 530, 532, and 534. Components 528-534 may be similar to corresponding components 516-522, shown and described with reference to FIG. 5A. As illustrated, client 524 may connect to servers 526 through multiple cloud servers 530-534. Thus, if one connection attempt or established connection fails because a cloud server 530-534 malfunctions, client 524 and/or server 526 may use a connection with a different cloud server 530-534 to maintain a communication session.

Upon establishing connections with servers 526, client 524 and/or servers 526 may select one of the established connections to maintain an active session 536 and other connections to be standby connections 538 and 540. For example, in some implementations, after establishing the connections with servers 526, servers 526 may select one connection to use to enable client 524 to access a communication session to create active session 536. Servers 526 may exchange data packets with client 524 via the connection that maintains active session 536. The exchanged data packets may contain data for the interactions of client 524 with the communication session. Servers 526 may send client 524 standby commands via standby connections 538 and 540 to indicate for client 524 not to access the active session 536 through standby connections 538 and 540. Thus, client 524 and/or servers 526 may maintain active session 536 and standby connections 538-540 as client 524 accesses active session 536.

In some implementations, servers 526 may select the connections to use to create active sessions and standby connections based on the priority information for each of the connections. Such priorities may be values that are determined based on the relative strength or potential strength of the connections. For example, the connection that is used for active session 536 may have a first priority 542 and standby connections 538 and 540 may have priorities 544 and 546, respectively. Servers 526 may identify such priorities from the connection request data packets that client 524 includes in each connection's respective connection requests. In some implementations, servers 526 can maintain the priorities in a database and identify the priorities from the database. Servers 526 may compare the priorities for the requested connections and the select the connection to maintain the communication session with client 524 responsive to the connection having the highest priority. After selecting the connection, servers 526 may transmit data packets containing data for active session 536 through the connection that maintains active session 536 and send standby commands through standby connections 538 and 540 to establish the standby connections.

As illustrated in sequence 522, while client 524 accesses the communication session through active session 536, the active session 536 may fail or drop. When this occurs, servers 526 may migrate the active session to standby connection 538 (e.g., transmit the active session data packets through connection 538 instead of the connection for session 536). Servers 526 may migrate the communication session to connection 538 instead of other standby connections that servers 526 have maintained with client 524 responsive to determining standby connection 538 has the highest priority or otherwise satisfies another criteria (e.g., has the strongest connection). Because standby connection 538 was already being maintained, server 526 may transfer the communication session without client 524 losing access to servers 526 or the communication session. Further, while client 524 accesses the communication session through connection 538, client 524 and servers 526 may attempt to re-establish the connection that previously hosted the communication session in case the connection 538 drops and/or the previous connection is stronger and servers 526 can revert back to the stronger connection. Accordingly, client 524 may maintain its connection to servers 526 without requiring a restart and/or without client 524 needing to establish a new connection with servers 526 each time a connection drops.

Thus, implementing the systems and methods may provide a few advantages over previous systems. First, the systems and methods may provide a framework for defining multiple paths for the communication between a client and a server for a communication session launch, thus providing resiliency during a session launch (e.g., the ability to switch between connections if one connection fails). Second, the systems and methods may provide for an interface for defining properties for a connection (e.g., the ability to select different connection characteristics for a connection with a communication session). Third, the systems and methods may eliminate the requirement for session reconnect processing which may accompany a glitch for the launched session for any user and/or failures based on different error conditions. Finally, the systems and methods may help the server that maintains multiple connections deterministically determine which connections to use to establish an active session with a client to provide a communication session.

Figure 6:
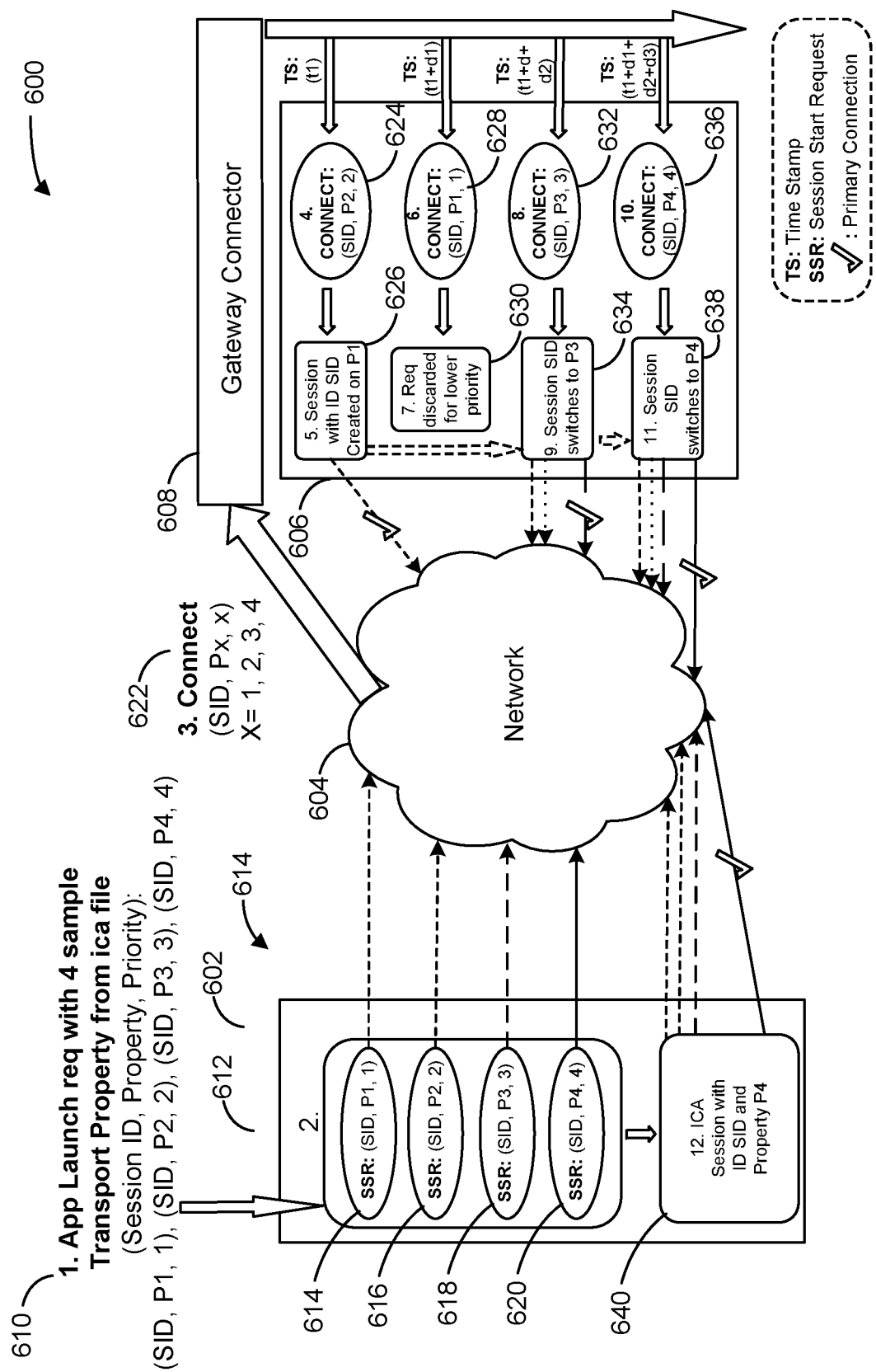
FIG. 6 is a block diagram of a system for priority-based transport connection control, in accordance with an illustrative embodiment.

Referring now to FIG. 6, a block diagram of a system 600 that illustrates a flow of migrating communication sessions between different established communication sessions based on the priorities of the communication sessions, in accordance with an illustrative embodiment. System 600 is shown to include a client device 602 in communication over a network 604 with a server 606. Client device 602, network 604, and server 606 may be similar to or the same as client 102, network 104, and server 106, shown and described with reference to FIG. 1. Client device 602 may further communicate with server 606 via a gateway connector 608, which may be a gateway (e.g., appliance 200) that enables server 606 to connect to network 604.

At an operation 610, a user may initiate an application launch request at client device 602. The application launch request may be a request to launch an application 612 on client device 602 such that application 612 connects to a corresponding application on server 606 to access a communication session hosted by server 606. The application launch request may include information for application 612 to use to generate a number (e.g., four) of communication requests 614, 616, 618, and 620 to send to server 606 via different connections (e.g., via different communication protocols, different routing paths, etc.). Each communication request may include a matching session identifier and property and priority information for the respective connections (described in further detail below).

At an operation 622, network 604 may transmit connection requests to gateway connector 608 to transmit to server 606. At an operation 624, server 606 may connect with client device 602 based on the data contained in communication request 616 and, at operation 626, create an active (primary) communication session with client device 602 via the new connection. At an operation 628, server 606 may connect with client device 602 based on the data contained in communication request 614. At operation 630, server 606 may determine the priority of the connection of request 614 is lower than the priority of the connection of communication request 616 and discard (e.g., delete or ignore) request 614 or set the connection for request 614 as a standby connection by sending client device 602 a standby command via the connection. At an operation 632, server 606 may connect with client device 602 based on the data contained in communication request 618. At an operation 634, server 606 may determine the priority of the new connection is higher than the previously active connection and migrate the active communication session to the new connection. Similarly, at an operation 636, server 606 may connect with client device 602 based on the data contained in communication request 620. At an operation 638, server 606 may determine the priority of the new connection is higher than the previously active connection and again migrate the active communication session to the new connection.

At an operation 640, client device 602 may maintain an active communication session with server 606 through the active connections as server 606 migrates through the different connections based on the priorities of the connections. Thus, client device 602 may maintain an active communication session with server 606 despite server 606 continuously changing the connections that server 606 uses to provide client device 602 with the data packets for the communication session.

Figure 7:
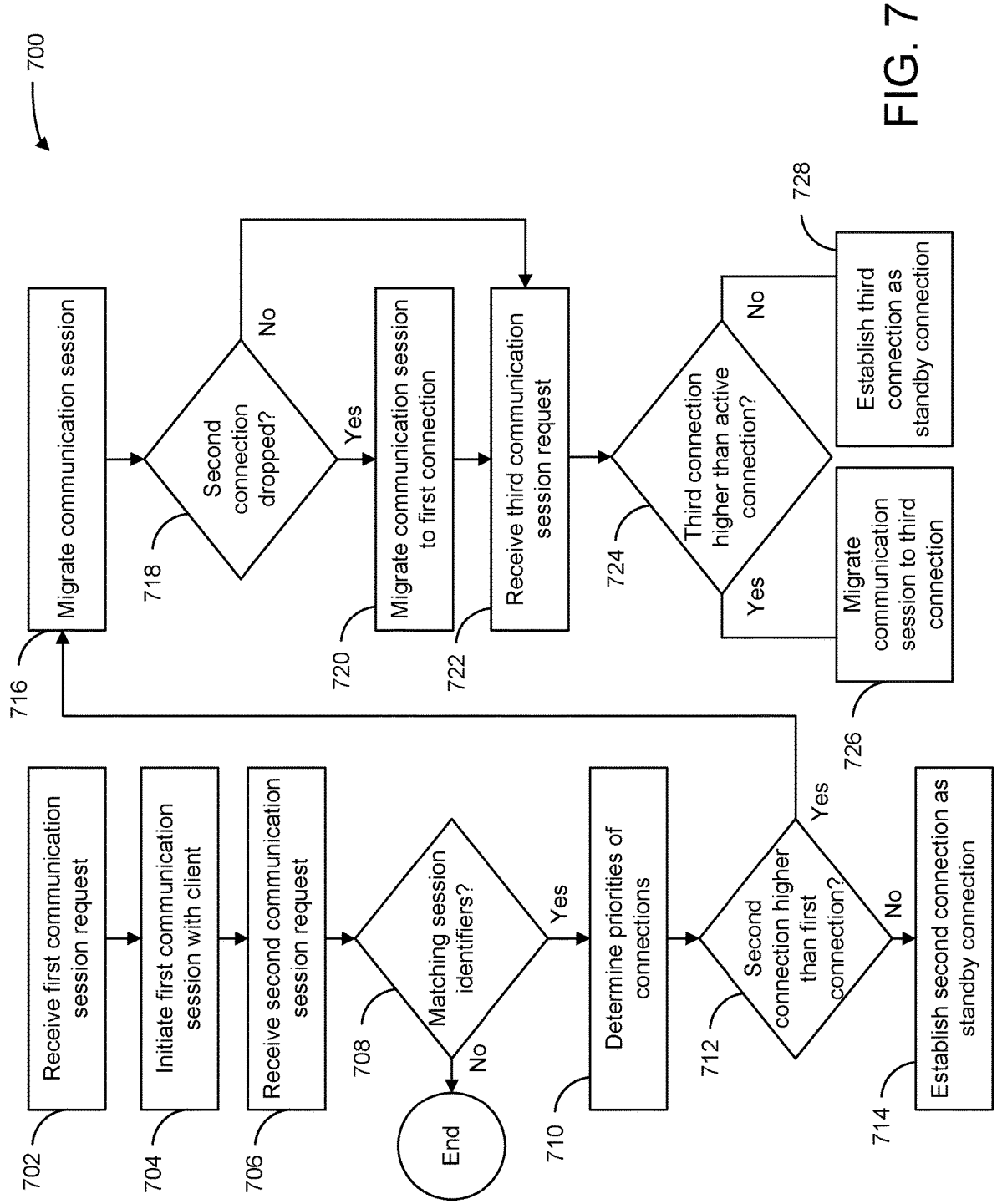
FIG. 7 is a flow diagram of priority-based transport connection control, in accordance with an illustrative embodiment.

Referring now to FIG. 7, a flow diagram of a method 700 for priority-based transport connection control is shown, in accordance with an illustrative embodiment. The functionalities of method 700 may be implemented using, or performed by, a data processing system (e.g., client 102, server 106, or appliance 200). In brief overview, the data processing system may establish multiple connections with a client device attempting to access a communication session being hosted by the data processing system. The data processing system may establish the connections and select one of the connections based on priority information for the connections to use to exchange data for the communication session with the client device. The data processing system may establish multiple connections and migrate the communication session to different connections over time as the active communication sessions fail and/or the data processing system identifies connections with higher priorities. By maintaining multiple connections at once and using priorities (which may correspond to the connection strengths for the connections) to identify connections to use for an active communication session, the data processing system may ensure that a client device may maintain its access to a communication session and have a strong a connection with the data processing system in doing so.

At an operation 702, the data processing system may receive a first communication session request from a client device via a first connection. The first communication session request may be an API request to establish a communication session via the first connection. The request may include a request data packet or file that includes a session identifier, property information, and/or priority information for the connection. The session identifier may be an identifier for the communication session that the client device is attempting to establish with the data processing system (e.g., session 1, session_1, session one, etc.). The client device may use the same session identifier for each connection that the client device attempts to establish with the data processing system such that the data processing system may be able to identify connections that correspond to the same communication session during a failover event or if the connection attempt via the first connection fails, or so the data processing system can migrate the communication session to stronger connections or connections with a higher priority. In some implementations, upon receiving the first communication session request, the data processing system may store the information included in the request in memory (e.g., in a database).

The property information that the client device may include in the request may include information about the connection itself. For example, the property information may include an encryption type, a compression type, a connection latency, round-trip time, a connection bandwidth, a connection loss rate, a transport protocol, a network path, a network type, a Quality-of-Service (QoS) setting, a source domain, a destination domain, etc. The properties may include acceptable and/or expected values for the different property types. For example, for connection latency, the client device may determine an expected latency for the connection to include in the request based on an input from the user (e.g., the user may input an expected connection latency if the data processing system successfully establishes a connection with the client device via the first connection) or based on connection latency of a connection that was previously established with the client device with the same or similar properties. Other properties may be characteristics of the connection that would be created. For example, a user may input properties such as the encryption type, the compression type, connection bandwidth transport protocol, network type, etc., to include in the communication session request. The data processing system may receive and attempt to establish a connection with the client device based on these properties (e.g., send data packets to the client device using the requested encryption and compression types and Quality-of-Service setting).

The priority information may be a priority for the connection. The priority information may include a priority for the connection relative to priorities of other connections that the client device attempts to establish when connecting with the data processing system. For example, the priority information may be or include a numerical value indicating the priority of the connection relative to another connection (e.g., the priority of the first connection may be one and the priority of another connection may be two). Depending on the configuration of the data processing system, higher priorities may be lower numbers compared to other numbers or vice versa (e.g., a priority of one may be the highest priority or the lowest priority). The data processing system may use the priority information to determine which connection to use to maintain an active connection when hosting a communication session for the client device.

At an operation 704, responsive to receiving the request, the data processing system may initiate a first communication session with the client device via the first connection. The data processing system may initiate the first communication session by first establishing the first connection. For example, the data processing system and client device may establish the first connection via a handshaking protocol with the client device. In some implementations, upon establishing the first connection, the data processing system may provide the client device with a communication session that the client device may access. In some such instances, the handshaking protocol may fail. For example, in some implementations, errors may occur when the two systems do not have a compatible configuration or have a poor network connection. In such instances, the data processing system and the client device may continuously attempt to establish the first connection until the connection is successfully created.

At an operation 706, the data processing system may receive a second communication session request via a second connection. The data processing system may receive the second communication session request after the client device has established a connection with the data processing system via the first connection, after the client device has failed to establish the first connection, and/or in parallel (e.g., at substantially the same time) with the first communication session request. The second connection may have different properties or characteristics from the first connection. For instance, the second connection may connect to the data processing system through a different edge or cloud device and/or have different performance properties (e.g., latency, QoS characteristics, likelihood of dropping, format, encryption type, compression type, etc.). The second communication session request may include a request data packet similar to the request data packet of the first communication session request. For instance, the second communication session request may include a session identifier that is identical to or that matches the session identifier in the first communication request. The second communication session request may also include property information defining the second connection. Finally, the second communication session request may include priority information indicating a priority of the second connection relative at least to the first connection such that the data processing system may select which of the first and second connections to use to establish an active communication session with the client device to provide a communication session to the client device or whether to migrate the communication session to the second connection from the first connection. Upon receiving the second communication request, the data processing system may establish a second connection with the client device.

At an operation 708, the data processing system may determine whether the data packet of the second communication session request has a matching session identifier to the data packet of the first second communication session request. For instance, the data processing system may store the session identifier from the first communication session request in a database and retrieve the session identifier upon receiving the second communication request. The data processing system may extract the session identifier from the second communication request and compare the two session identifiers. If the session identifiers match, the data processing system may store the data from the two requests in memory with an indication that the two requests are associated with the same communication session (e.g., as related connections in a relational database). If the session identifiers do not match, the data processing system may determine the session requests are not related to the same communication session (e.g., are associated with different hosted communication sessions). In such cases, the data processing system may store the session identifiers as well as information for the connections in memory (e.g., in a database) as being associated with different connections.

However, responsive to determining the session identifiers match, at an operation 710, the data processing system may determine the priorities of the first connection and the second connection. The data processing system may determine the priorities of the connections by identifying the identifiers of the priorities from the connection requests. For example, upon determining the second communication session request for a connection for the same communication session, the data processing system may identify the priorities that were provided with the two communication requests as the priorities for the first and second connections, respectively. The data processing system may use such priorities to determine which connection to use to provide the communication session to the client device (e.g., use the connection with the highest priority to provide the communication session).

In some implementations, the data processing system may determine the priorities of the connections based on the properties of the connections. For example, the data processing system may be configured to determine priorities for connections based on a series of stored rules for different properties. For example, the data processing system may rank different connections based on the latency, quality of service, and/or likelihood of dropping for each connection. The data processing system may send test signals via the connections to determine values for each of such properties or identify stored values for the properties from previously established connections with the same or similar properties to the connection for which the data processing system is determining a priority. The data processing system may rank the connections based on the values (e.g., rank connections in descending order with the connection with the least amount of latency, highest quality of service, and/or lowest likelihood of dropping the highest). In some implementations, the data processing system may rank the priorities based on whether the properties meet other criteria (e.g., the connections have an encryption type that matches the encryption type in a request or a matching compression type). In some implementations, the data processing may rank the connections based on a combination of such properties (e.g., a connection with a low latency and non-matching encryption type may be ranked higher than a connection type with a low likelihood of dropping and a matching encryption type). The data processing system may use any criteria to determine ranks and priorities for different connections. Upon determining such priorities, the data processing system may assign the priorities to the different connections by storing an association between the connections and the priorities in a database.

In some implementations, the data processing system may dynamically determine the priorities of the connections after the connections have been established. The data processing system may do so based on the properties that may change over time. For example, one connection may experience an increase in latency and/or likelihood to drop while another connection may experience a decrease in latency and/or likelihood to drop. Thus the data processing system may lower the priority of the connection with the increased latency and increase the priority of the connection with the decreased latency. The data processing system may poll each connection at intervals (e.g., predetermined intervals) to determine characteristics for the connections to determine such priorities. The data processing system may compare the new priorities with each other and switch the active connection to a connection with a new priority if the data processing system identifies a connection with a higher priority than the active connection. Thus, the data processing system may determine the priorities for connections in real-time such that the data processing system can switch between connections to provide the communication session to the client device across a strong connection.

At an operation 712, the data processing system may determine whether the priority of the second connection is higher than the priority of the first connection. The data processing system may make the determination by comparing the two priorities and identifying the connection that is associated with the highest priority. In some implementations, responsive to determining the second connection has a lower priority than the first connection, at an operation 714, the data processing system may establish the second connection as a standby connection. For instance, the data processing system may transmit a standby mode command to the client device via the second connection to indicate the second connection is not active and the client device cannot access the communication session via the second connection. The data processing system may, however, maintain the second connection with the client device by sending packets such as "keepalive" data packets to prevent disconnection and to determine if the connection ever breaks so the data processing system and the client device can re-establish the connection.

However, responsive to determining the priority of the second connection is higher than the priority of the first connection, at an operation 716, the data processing system may migrate the communication session to the second connection. For instance, upon determining the second connection has a higher priority than the first connection, the data processing system may transmit a connection standby command to the client device via the first connection that causes the client device and the data processing system to stop exchanging data regarding a communication session application between each other and instead exchange keepalive data packets with each other to maintain a standby connection. The data processing system may then transfer the communication session for the communication session to the second connection by transmitting data packets of the communication session to the client device via the second connection. Thus, the data processing system may switch active connections with the client device between different connections without the client device losing access to the communication session and while maintaining a strong connection.

In some implementations, the data processing system may migrate the communication session to the second connection by detaching the first connection (e.g., detach the communication session from the first connection) from a server application that maintains the communication session and attaching the second connection to the server application (e.g., attach the communication session to the second connection). For instance, the data processing system may store and execute a server application to provide the communication session to the client device. The server application may maintain multiple connections with a corresponding application on the client device with one of the connections providing the active communication session for exchanging data packets for the communication session and the other connections remaining in standby mode. Upon determining the second connection has a higher priority than the active first connection, the data processing system may detach the communication session from the first connection with the server application and attach the communication session to the second connection with the server application.

At an operation 718, the data processing system can determine whether the second connection dropped. For example, the data processing system may determine the second connection dropped responsive to determining the data processing system has not received a data packet from the client device in a predetermined amount of time. In another example, the data processing system may determine the second connection dropped responsive to receiving an error message from the client device indicating a data packet could not be processed or the connection failed. In some implementations, the data processing system may periodically send keepalive packets to the client device via the second connection to determine if the client device has disconnected from the data processing system. Such connections may drop for various reasons such as a transport control protocol reset or an idle timeout.

Responsive to determining the communication session has dropped, at an operation 720, the data processing system may migrate the communication session to the first connection. For instance, after migrating the communication session from the first connection to the second connection and establishing the first connection as a standby connection, the data processing system may determine the second connection dropped or failed. The data processing system may compare the priorities of the connections established with the same session id as the communication session that are in standby mode and identify the connection with the highest priority. The data processing system may then migrate the communication session to the connection with the highest priority so the client device can maintain its access to the communication session without needing to establish a new session and ensuring the strongest connection. Responsive to the first connection having the highest priority of the remaining connections, the data processing system may migrate the communication session to the first connection.

At an operation 722, the data processing system may receive a third communication session request via a third connection. The third communication session request may have the same session identifier as the session identifiers of the first and second communication requests as well as property and/or priority information for the third connection. The third connection may have a priority which the data processing system may determine similar to the above (e.g., determine based on an identifier of the priority in the request or determine based on one or properties of the third connection). At an operation 724, the data processing system may determine whether the third connection has a higher priority than the active connection (e.g., the second connection or the connection maintaining the communication session). The data processing system may compare the priorities of the third connection and the active connection and identify the connection with the highest priority. Responsive to the third connection having a higher priority, at an operation 726, the data processing system may migrate the communication session to the third connection. However, responsive to the third connection having a lower priority than the active connection, at an operation 728, the data processing system may transmit a standby command to the third connection and establish the third connection as a standby connection.

In an example implementation, the data processing system may continue to switch between connections with a client device as the data processing system hosts a communication session for the client device. For instance, as the data processing system establishes connections with the client device, the data processing system may continue to compare the priorities of the new connections with the priority of the active connection. The data processing system may switch the active connection to a new connection with a higher priority than the current active connection and set any connections with a lower priority to be a standby connection. Further, if the active connection ever drops, the data processing system may identify the standby connection with the highest priority and switch to the identified standby connection to provide the communication session as the data processing system attempts to re-establish the dropped connection. The data processing system may similarly attempt to re-establish any dropped standby connections so the standby connections can be available to take over if the active connection drops. Thus, the data processing system may continue to provide a strong connection to the client device while reducing the risk of the client device losing access to the communication session.

Figure 8:
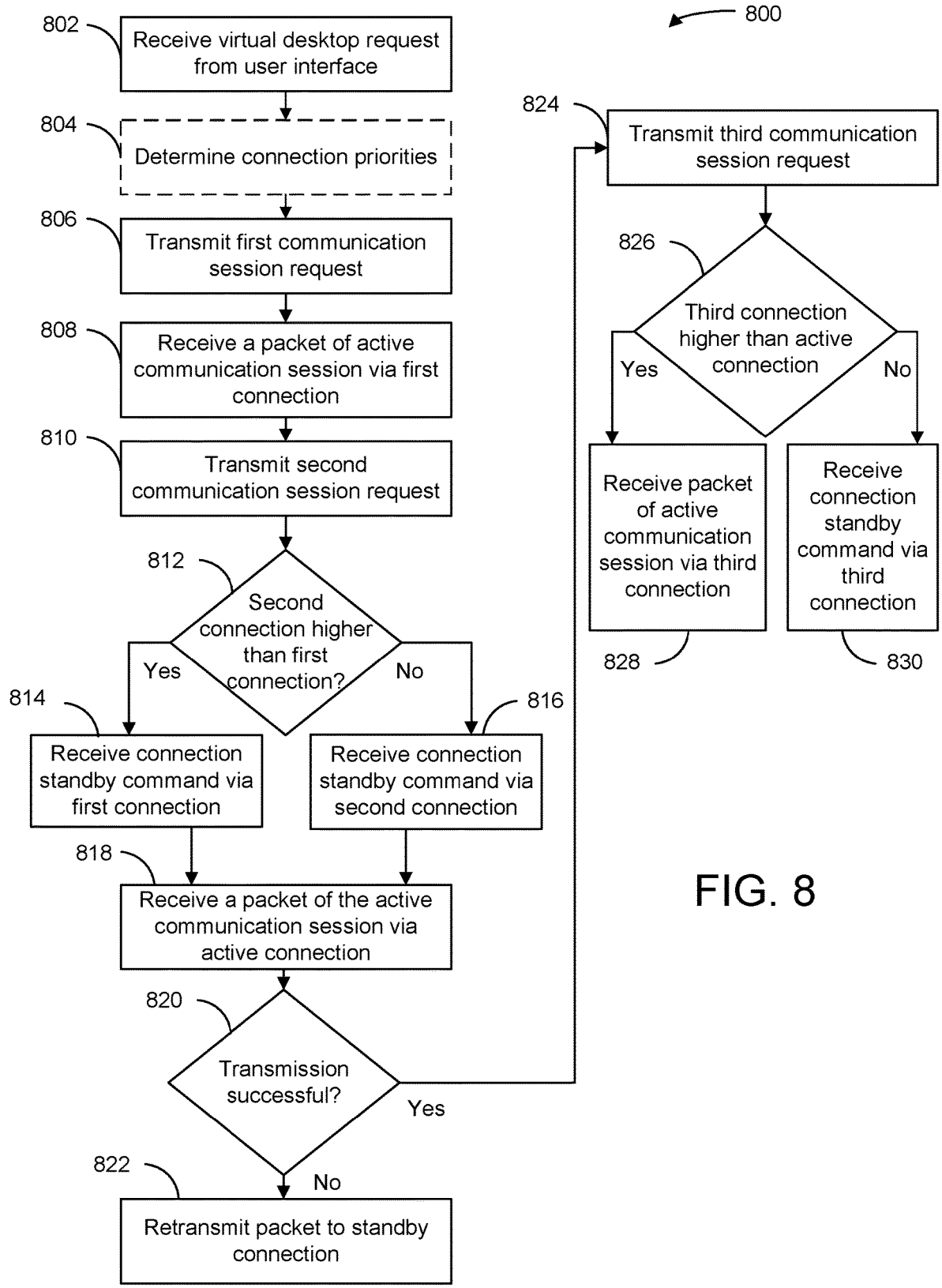
FIG. 8 is another flow diagram of priority-based transport connection control, in accordance with an illustrative embodiment.

Referring now to FIG. 8, a flow diagram of a method 800 for priority-based transport connection control is shown, in accordance with an illustrative embodiment. The functionalities of method 800 may be implemented using, or performed by, a data processing system (e.g., client 102, server 106, or appliance 200). In some implementations, method 700 may be substantially performed by a server hosting a communication session for a client device and method 800 may be substantially performed by the client device accessing the communication session from the server. In brief overview, the data processing system may establish multiple connections with a server hosting a communication session. The data processing system may transmit communication session requests to the server in succession to establish multiple connections with the server. The data processing system may include priorities with the requests that the server may use to determine which connections to use to maintain the communication session. The data processing system may maintain standby connections in addition to the active connection so the data processing system and the server may quickly switch between connections in case the connection maintaining the communication session drops and/or so the data processing system can access the communication if the connection with highest priority cannot be established.

At an operation 802, the data processing system may receive a communication session request from a user interface. A user may make the communication session request by selecting a button on a user interface of the data processing system. Receiving the request may cause an application of the data processing system to attempt to connect to a corresponding application at a server to access a communication session that is maintained by the server.

At an operation 804, in some implementations, the data processing system may determine connection priorities of different connections or potential connections with the server. For example, the data processing system may maintain a list of priorities for different connections in memory (e.g., in a database). In some implementations, a user may set the priorities for each connection. In some implementations, the data processing system may determine the priorities for different connections based on properties of the connections. The data processing system may do so similar to the manner described at operation 710 above (e.g., rank and assign priorities to different connections based on different criteria for the connections which may be set by a user). The data processing system may determine such priorities and include the priorities in any communication session requests that the data processing system transmits to the server so the server may determine which connection to set as the active connection and use to provide the communication session to the data processing system.

At an operation 806, the data processing system may transmit a first communication session request to the server via a first connection. The data processing system may transmit the first communication session request as a data packet that includes a priority for the first connection and/or property information for the first connection. Via a handshaking protocol, the data processing may establish a connection with the data processing system via the first connection based on the properties in the request (e.g., using the defined compression and/or encryption type).

Upon establishing the first connection, the data processing system may provide a communication session to the client device via the first connection. For instance, at an operation 808, the data processing system may receive a data packet with data from the data processing system's interaction with the server via the first connection. The data processing system and the server may exchange data packets via the first connection over time to enable a user to access the communication session.

At an operation 810, the data processing system may transmit a second communication session request to the server via a second connection. The second communication session request may contain the same session identifier as the first communication session request as well as priority and/or property information for the second connection. The server may receive the second request and establish the second connection with the data processing system via a handshaking protocol.

At an operation 812, the server may determine whether the second connection has a higher priority than the first connection. Responsive to the server determining the second connection has a higher priority, at an operation 814, the data processing system may receive a connection standby command via the first connection. However, responsive to the server determining the first connection has a higher priority than the second connection, at an operation 816, the data processing system may receive a connection standby command via the second connection. The session standby command may indicate for the data processing system not to send data to access the communication session via the connection for which the command was sent. After receiving the connection standby command via either the first connection or the second connection, the data processing system may maintain the connection through which the standby command was sent as a standby session.

At an operation 818, the data processing system may receive a packet of the communication session via the active connection. For instance, if the first connection has a higher priority than the second session, the server may continue to use the first connection to maintain the communication session and transmit packets for the communication session through the first connection. However, if the first connection has a lower priority than the second connection, the server may migrate the communication session for the communication session to the second connection and transmit packets for the communication session through the second connection. Thus, the data processing system may transition between different connections based on the connections having a higher priority (e.g., based on the connections being stronger), which can reduce latency in the communication session and reduce the chances of the connection dropping during the session.

As the data processing system exchanges data packets with the server, at operation 820, the data processing system may determine if the packets that the data processing system transmits to the server were transmitted successfully (e.g., determine whether the connection dropped). The data processing system may do so by determining whether the server transmitted a data packet back to the data processing system within a threshold amount of time. If the data processing system does not receive a response from the server within the threshold amount of time and determines a transmission was unsuccessful, at an operation 822, the data processing system may retransmit the same packet to the server via the connection the data processing system has with the server with the highest priority. For example, if the second connection is the active connection and the second connection drops, the data processing system may transmit the data packet to the server via the connection with the highest priority, thus establishing the new connection as the active connection to maintain the communication session between the data processing system and the server. After establishing a new communication session, the data processing system and the server may attempt to re-establish the dropped connection. Upon re-establishing the previously dropped connection, the data processing system or server may migrate the communication session back to the re-established connection, in some cases responsive to determining the re-established connection has a higher priority.

At an operation 824, the data processing system may establish a new connection with the server by transmitting a third communication session request to the server via a third connection. The third communication request may include the same session identifier as the first and second communication requests and property and/or priority information for the third connection. At an operation 826, the server may determine if the third connection has a higher priority than the active connection (e.g., the first or second connection). If the server determines the third connection has a higher priority than the active connection, the server may migrate the communication session to the third connection and the data processing system may receive a packet from the communication session via the third connection. However, if the server determines the third connection has a lower priority than the active connection, the server may transmit a standby command to the data processing system such that the server and the data processing system may maintain the third connection as a standby connection while the previously active connection remains active. Thus, the third connection may become active if it has the highest priority of the standby connections when or if the active connection fails or drops.

Figure 9:
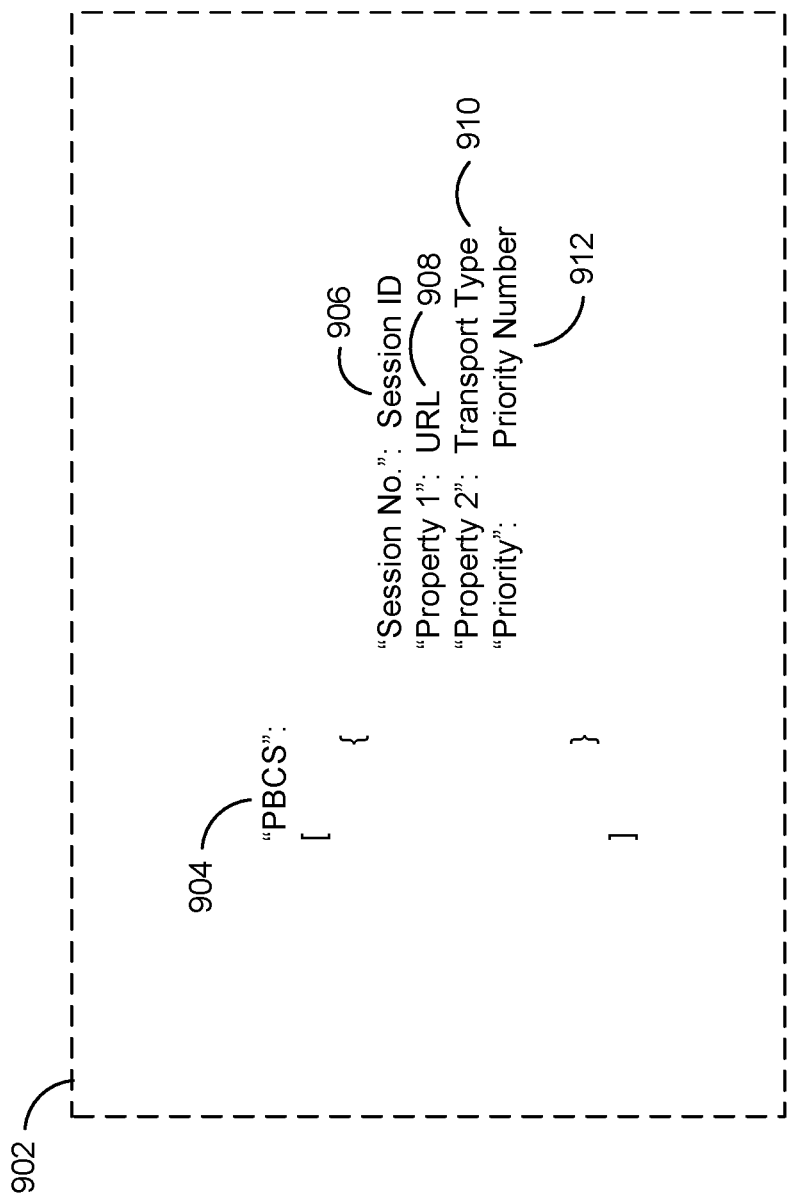
FIG. 9 is an illustration of a data packet in a connection request, in accordance with an illustrative embodiment.

Referring now to FIG. 9, an illustration of a data packet 902 in a connection request is shown, in accordance with an illustrative embodiment. Data packet 902 may be or include a file with data that a server can use to establish a communication session with a client device via a particular connection. For example, data packet 902 may include an identifier 904 of the set of computer-readable instructions that the server can use to establish a connection with the client device. The set of instructions may include a session number 906, properties 908 and 910, and a priority 912. Although properties 908 and 910 are shown as a URL and a transport, data packet 902 may include any properties that describe the requested connection. The server may retrieve the data packet and establish a priority number for the connection based on the property number and/or properties 908 and 910. The server may also retrieve session number 906 from data packet 902 to establish the connection as being associated with session number 906. The server may use such information to establish the connection as a standby connection or an active connection and/or to determine whether to switch to the connection to provide a communication session as described herein.

Accordingly, the systems and methods discussed herein provide for an improved method of transport connection control that enables a seamless transition between previously established connections between a client and a server to create a communication session. The server may continuously attempt to create and use stronger connections to provide the client with a communication session such that it becomes less likely the connection between the two devices drops or experiences periods of significant latency. Multiple network connections may be maintained between the client and the server maintaining the communication session such that if an active network connection drops or fails, the client may maintain its session with the server by automatically switching to another connection without establishing a new connection. The connections may be assigned priorities based on the strength of their connections so if one or more of the connections drop, the client may switch to the next strongest connection to maintain its communication session with the server without any degradation to the user experience or the client needing to re-establish a new connection for a new communication session.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein. Terms such as "first" and "second" are not intended to imply any particular order unless otherwise noted, and are primarily used to distinguish items from each other—e.g. a second item may temporally occur prior to a first item.

It will be further understood that various changes in the details, materials, and arrangements of the parts that have been described and illustrated herein may be made by those skilled in the art without departing from the scope of the following claims.

What is claimed is:

1. A method, comprising:
   receiving, by a server computing device from a client computing device via a first connection, a first request to establish a communication session, the first request comprising a first session identifier, and the first connection having a first communication property and a first priority;
   initiating, by the server computing device, the communication session with the client computing device via the first connection;
   receiving, by the server computing device from the client computing device via a second connection, a second request to establish a communication session, the second request comprising the first session identifier included in the first request, and the second connection having a second communication property and a second priority;
   determining, by the server computing device responsive to the second request comprising the first session identifier included in the first request, that the second priority of the second connection exceeds the first priority of the first connection; and
   responsive to the determination, migrating, by the server computing device, the communication session to the second connection.

2. The method of claim 1, wherein the first request comprises an identifier of the first priority, and wherein the second request comprises an identifier of the second priority.

3. The method of claim 1, further comprising determining, by the server computing device, the first priority based on the first communication property and the second priority based on the second communication property.

4. The method of claim 1, wherein migrating the communication session to the second connection comprises transmitting, by the server computing device, a connection standby command via the first connection.

5. The method of claim 4, further comprising:
   subsequent to transmitting the connection standby command via the first connection, determining, by the server computing device, the first connection has dropped; and
   re-establishing, by the server computing device, the first connection while concurrently maintaining the communication session via the second connection.

6. The method of claim 1, wherein migrating the communication session to the second connection comprises detaching the first connection from a server application providing the communication session and attaching the second connection to the server application.

7. The method of claim 1, further comprising:
   subsequently receiving, by the server computing device from the client computing device via a third connection, a third request to establish a communication session, the third request comprising the first session identifier included in the first request, and the third connection having a third communication property and a third priority;
   determining, by the server computing device responsive to the third request comprising the first session identifier included in the first request, that the third priority of the third connection is less than the second priority of the second connection; and
   responsive to the determination that the third priority is less than the second priority, transmitting, by the server computing device, a connection standby command via the third connection.

8. The method of claim 1, wherein the first communication property comprises an encryption type, a compression type, a connection latency, a connection bandwidth, a connection loss rate, a transport protocol, a network path, a network type, a Quality-of-Service (QoS) setting, a source domain, or a destination domain.

9. The method of claim 1, further comprising:
   subsequent to migrating the communication session to the second connection, determining, by the server computing device, the second connection has dropped;
   identifying, by the server computing device, a third connection responsive to the third connection having a higher priority than the first connection; and
   migrating, by the server computing device, the communication session to the third connection responsive to the determination that the second connection dropped and the identification of the third connection.

10. The method of claim 1, further comprising:
subsequent to migrating the communication session to the second connection, transmitting, by the server computing device, a data packet of the communication session to the client computing device via the second connection.

11. A system, comprising:
a server computing device comprising at least one network interface in communication with a client computing device via a plurality of connections, and a processor configured to:
receive, via a first connection of the plurality of connections, a first request to establish a communication session, the first request comprising a first session identifier, and the first connection having a first communication property and a first priority,
initiate the communication session with the client computing device via the first connection,
receive, via a second connection of the plurality of connections, a second request to establish a communication session, the second request comprising the first session identifier included in the first request, and the second connection having a second communication property and a second priority,
determine, responsive to the second request comprising the first session identifier included in the first request, that the second priority of the second connection exceeds the first priority of the first connection, and
responsive to the determination, migrate the communication session to the second connection.

12. The system of claim 11, wherein the first request comprises an identifier of the first priority, and wherein the second request comprises an identifier of the second priority.

13. The system of claim 11, wherein the processor is further configured to determine the first priority based on the first communication property and the second priority based on the second communication property.

14. The system of claim 11, wherein the processor is further configured to transmit a connection standby command via the first connection.

15. A method, comprising:
transmitting, by a client computing device to a server computing device via a first connection, a first request to establish a communication session, the first request comprising a first session identifier, and the first connection having a first communication property and a first priority;
transmitting, by the client computing device to the server computing device via a second connection, a second request to establish a communication session, the second request comprising the first session identifier included in the first request, and the second connection having a second communication property and a second priority;
receiving, by the client computing device from the server computing device via the first connection, at least one packet of the communication session;
subsequently receiving, by the client computing device from the server computing device via the first connection, a connection standby command, the connection standby command transmitted responsive to receipt of the second request to establish the communication session and the second priority exceeding the first priority; and
receiving, by the client computing device from the server computing device via the second connection, at least one additional packet of the communication session.

16. The method of claim 15, wherein the first request comprises an identifier of the first priority, and wherein the second request comprises an identifier of the second priority.

17. The method of claim 16, further comprising determining, by the client computing device, the first priority based on the first communication property and the second priority based on the second communication property.

18. The method of claim 15, further comprising:
transmitting, by the client computing device to the server computing device via a third connection, a third request to establish a communication session, the third request comprising the first session identifier included in the first request, and the third connection having a third communication property and a third priority; and
receiving, by the client computing device from the server computing device via the third connection, a second connection standby command, the second connection standby command transmitted responsive to receipt of the third request to establish the communication session and the second priority exceeding the third priority.

19. The method of claim 15, further comprising:
establishing, by the client computing device,
determining, by the client computing device, that a transmission of a packet of the communication session via the second connection was unsuccessful; and
retransmitting, by the client computing device, the packet via the first connection responsive to the determination.

20. The method of claim 15, wherein the first communication property comprises an encryption type, a compression type, a connection latency, a connection bandwidth, a connection loss rate, a transport protocol, a network path, a network type, a Quality-of-Service (QoS) setting, a source domain, or a destination domain.

* * * * *